US 11,442,275 B2

United States Patent
Schuck

(10) Patent No.: US 11,442,275 B2
(45) Date of Patent: Sep. 13, 2022

(54) EYEWEAR INCLUDING A PUSH-PULL LENS SET

(71) Applicant: Miller Schuck, Erie, CO (US)

(72) Inventor: Miller Schuck, Erie, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/128,158

(22) Filed: Dec. 20, 2020

(65) Prior Publication Data

US 2022/0197032 A1  Jun. 23, 2022

(51) Int. Cl.
```
G02B 27/01      (2006.01)
G02B 30/34      (2020.01)
G02C 11/00      (2006.01)
H04N 13/344     (2018.01)
H04N 13/239     (2018.01)
G02C 1/06       (2006.01)
```

(52) U.S. Cl.
CPC ......... *G02B 27/0172* (2013.01); *G02B 30/34* (2020.01); *G02C 11/10* (2013.01); *H04N 13/239* (2018.05); *H04N 13/344* (2018.05); *G02B 2027/014* (2013.01); *G02B 2027/0134* (2013.01); *G02B 2027/0138* (2013.01); *G02B 2027/0178* (2013.01); *G02C 1/06* (2013.01)

(58) Field of Classification Search
CPC .. G02B 27/017; G02B 27/0172; G02B 30/34; G02B 2027/0134; G02B 2027/0138; G02B 2027/014; G02B 2027/0178; H04N 13/344; H04N 13/239; G02C 11/10; G02C 1/06

See application file for complete search history.

(56) References Cited

U.S. PATENT DOCUMENTS 10,805,600 B2 * 10/2020 Keesling .............. H04N 13/246
2007/0126655 A1    6/2007 Takagi
2021/0141212 A1 *  5/2021 Jacoby ..................... G02C 7/14

FOREIGN PATENT DOCUMENTS

| EP | 3091740 A1   | 11/2016 |
| JP | 2012209941 A | 10/2012 |
| NO | 2019012385 A1 | 1/2019 |
| WO | 2019186132 A2 | 10/2019 |

OTHER PUBLICATIONS

International Search Report and Written Opinion for International Application No. PCT/US2021/058804, dated Mar. 2, 2022 (Feb. 3, 2022)—13 pages.

* cited by examiner

*Primary Examiner* — Alexander Eisen
*Assistant Examiner* — Cory A Almeida
(74) *Attorney, Agent, or Firm* — Culhane Meadows PLLC; Stephen J. Weed

(57) ABSTRACT

Eyewear having a stereoscopic display including a lens system, and a push-pull lens set including prisms to produce a binocular overlap of two images that coincides with an accommodation plane. The overlap of two virtual images generated by a respective display as seen by the user's two eyes provides user comfort. The stereoscopic display may have a single accommodation plane, where the binocular overlap of the two virtual images depends on the location of the accommodation plane and the depth of the content formed by disparity in the two images. By providing the content at or near the location where the virtual images are at least substantially overlapped, the user viewing comfort is improved. The binocular overlap is controlled by tilting or steering the virtual images inward, such that the overlap occurs at the accommodation plane.

20 Claims, 17 Drawing Sheets

US 11,442,275 B2

EYEWEAR INCLUDING A PUSH-PULL LENS SET

TECHNICAL FIELD

The present subject matter relates to an eyewear device, e.g., smart glasses and see-through displays.

BACKGROUND

Portable eyewear devices, such as smart glasses, headwear, and headgear available today integrate cameras and see-through displays. The see-through displays render an image viewable by a user.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
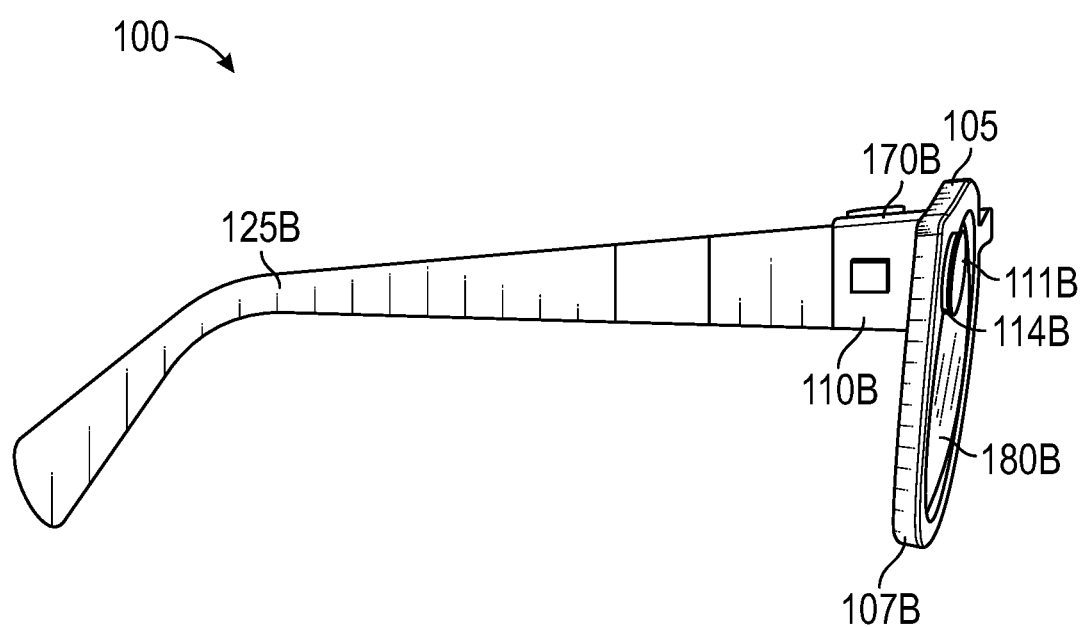
FIG. 1A is a side view of an example hardware configuration of an eyewear device, which shows a right optical assembly with an image display, and field of view adjustments are applied to a user interface presented on the image display based on detected head or eye movement by a user.

This disclosure is directed to eyewear having a stereoscopic display including a lens system, and a push-pull lens set including prisms to produce a binocular overlap of two images that coincides with an accommodation plane. The overlap of two virtual images generated by a respective display as seen by the user's two eyes provides user comfort. The stereoscopic display may have a single accommodation plane, where the binocular overlap of the two virtual images depends on the location of the accommodation plane and the depth of the content formed by disparity in the two images. By designing the optical system to place both the virtual image focus and the location of 100% binocular overlap at a depth in space where the virtual content is most likely to occur, the user comfort is improved. The binocular overlap is controlled by tilting or steering the virtual images inward, such that the overlap occurs at the accommodation plane.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

Figure 2A:
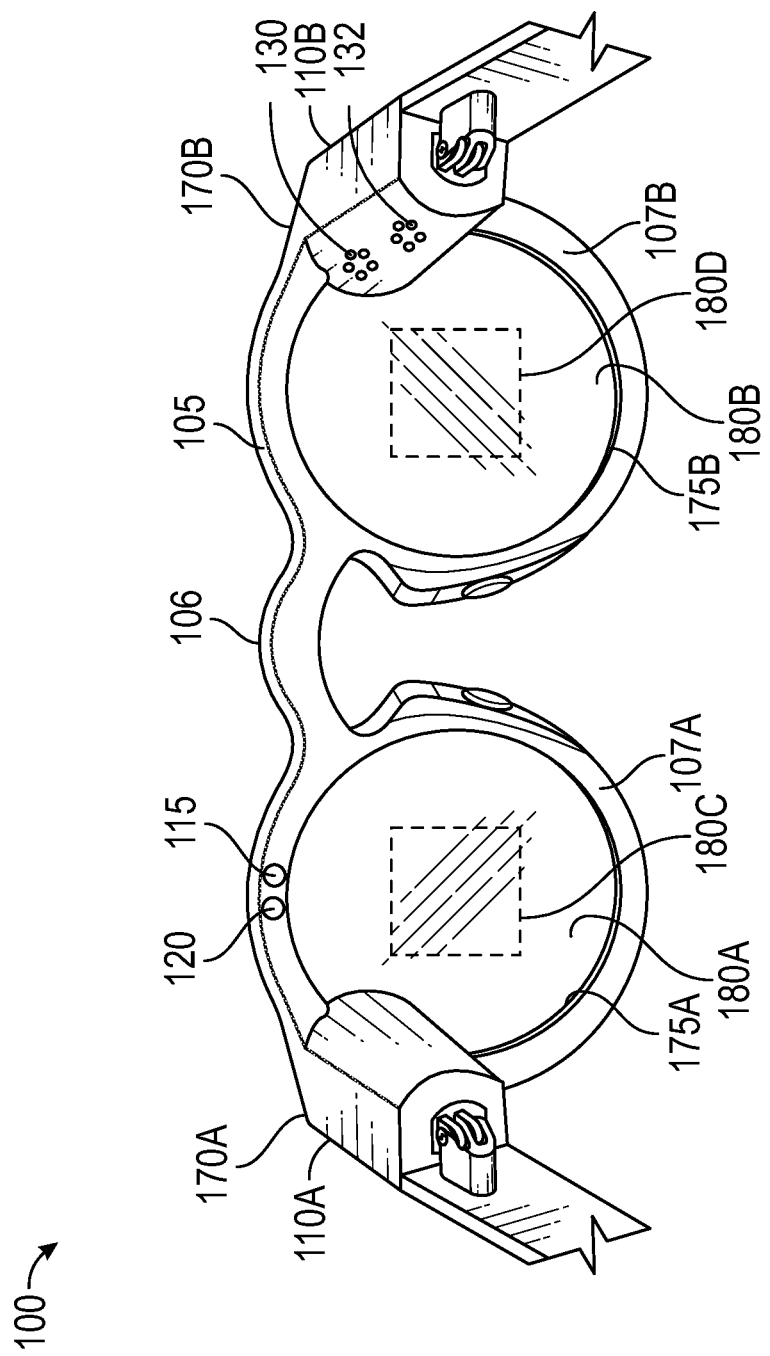
FIG. 2A is a rear view of an example hardware configuration of an eyewear device, which includes an eye scanner on a frame, for use in a system for identifying a user of the eyewear device.

FIG. 1A is a side view of an example hardware configuration of an eyewear device 100, which includes a right optical assembly 180B with an image display 180D (FIG. 2A). Eyewear device 100 includes multiple visible light cameras 114A-B (FIG. 7) that form a stereo camera, of which the right visible light camera 114B is located on a right temple portion 110B.

The left and right visible light cameras 114A-B have an image sensor that is sensitive to the visible light range wavelength. Each of the visible light cameras 114A-B have a different frontward facing angle of coverage, for example, visible light camera 114B has the depicted angle of coverage 111B. The angle of coverage is an angle range which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640$p$ (e.g., 640×480 pixels for a total of 0.3 megapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light camera 114A-B and process those signals from the visible light cameras 114A-B into a format suitable for storage in the memory (element 934 of FIG. 9). The timestamp can be added by the image processor 912 or other processor, which controls operation of the visible light cameras 114A-B. Visible light cameras 114A-B allow the stereo camera to simulate human binocular vision. Stereo cameras provide the ability to reproduce three-dimensional images (element 715 of FIG. 7) based on two captured images (elements 758A-B of FIG. 7) from the visible light cameras 114A-B, respectively, having the same timestamp. Such three-dimensional images 715 allow for an immersive life-like experience, e.g., for virtual reality or video gaming. For stereoscopic vision, the pair of images 758A-B are generated at a given moment in time—one image for each of the left and right visible light cameras 114A-B. When the pair of generated images 758A-B from the frontward facing field of view (FOV) 111A-B of the left and right visible light cameras 114A-B are stitched together (e.g., by the image processor 912), depth perception is provided by the optical assembly 180A-B.

In an example, a user interface field of view adjustment system includes the eyewear device 100. The eyewear device 100 includes a frame 105, a right temple portion 110B extending from a right lateral side 170B of the frame 105, and a see-through image display 180D (FIGS. 2A-B) comprising optical assembly 180B to present a graphical user interface to a user. The eyewear device 100 includes the left visible light camera 114A connected to the frame 105 or the left temple portion 110A to capture a first image of the scene. Eyewear device 100 further includes the right visible light camera 114B connected to the frame 105 or the right temple portion 110B to capture (e.g., simultaneously with the left visible light camera 114A) a second image of the scene which partially overlaps the first image. Although not shown in FIGS. 1A-B, the user interface field of view adjustment system further includes the processor 932 coupled to the eyewear device 100 and connected to the visible light cameras 114A-B, the memory 934 accessible to the processor 932, and programming in the memory 934, for example in the eyewear device 100 itself or another part of the user interface field of view adjustment system.

Figure 1B:
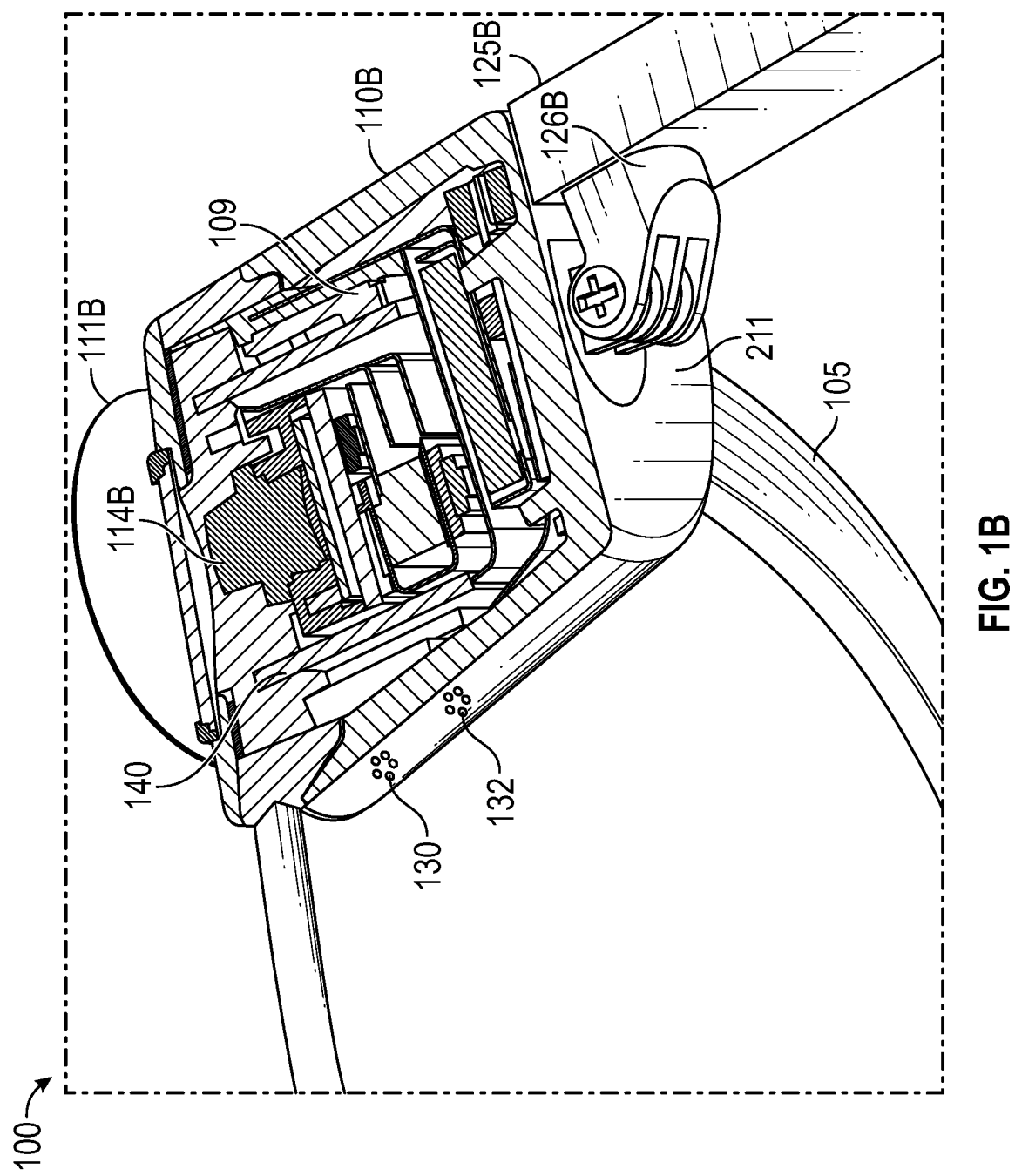
FIG. 1B is a top cross-sectional view of a temple of the eyewear device of FIG. 1A depicting a visible light camera, a head movement tracker for tracking the head movement of the user of the eyewear device, and a circuit board.
Figure 2B:
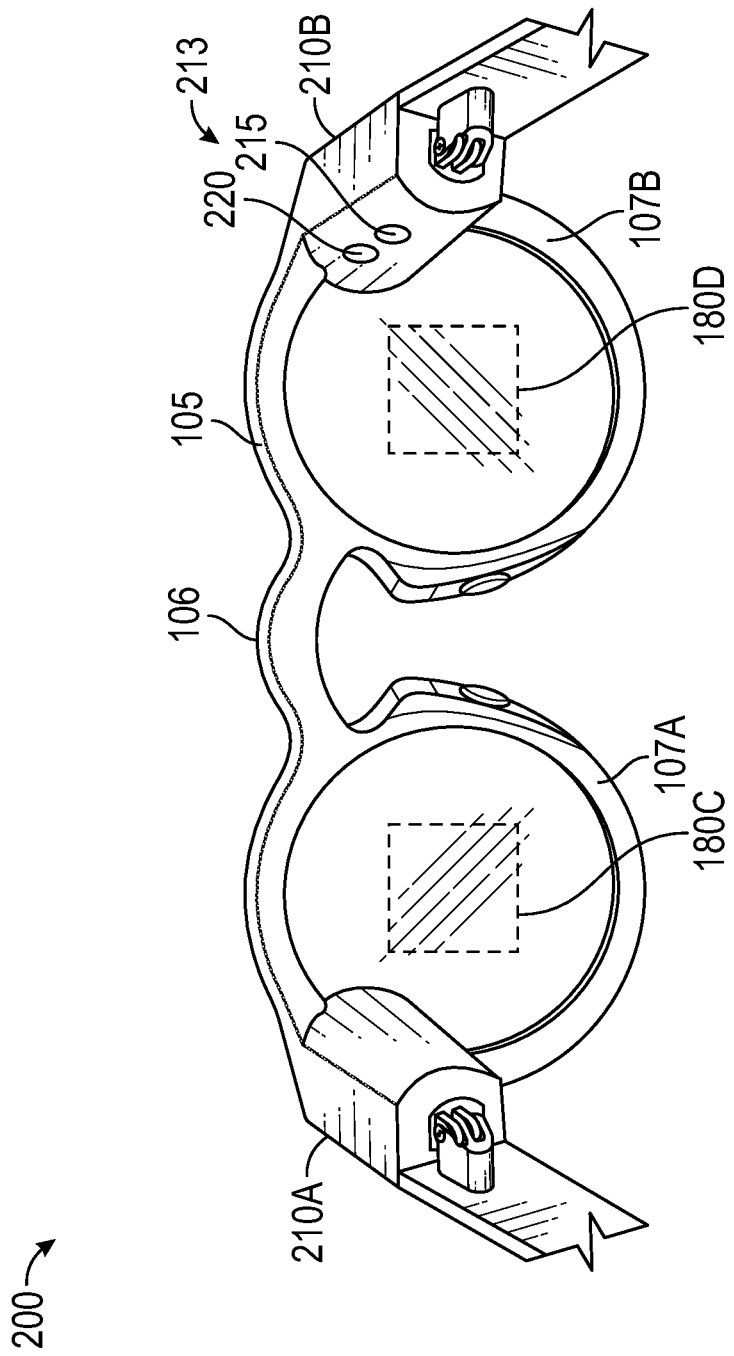
FIG. 2B is a rear view of an example hardware configuration of another eyewear device, which includes an eye scanner on a temple, for use in a system for identifying a user of the eyewear device.

Although not shown in FIG. 1A, the eyewear device 100 also includes a head movement tracker (element 109 of FIG. 1B) or an eye movement tracker (element 213 of FIGS. 2A-B). Eyewear device 100 further includes the see-through image displays 180C-D of optical assembly 180A-B, respectfully, for presenting a sequence of displayed images, and an image display driver (element 942 of FIG. 9) coupled to the see-through image displays 180C-D of optical assembly 180A-B to control the image displays 180C-D of optical assembly 180A-B to present the sequence of displayed images 715, which are described in further detail below. Eyewear device 100 further includes the memory 934 and the processor 932 having access to the image display driver 942 and the memory 934. Eyewear device 100 further includes programming (element 934 of FIG. 9) in the memory. Execution of the programming by the processor 932 configures the eyewear device 100 to perform functions, including functions to present, via the see-through image displays 180C-D, an initial displayed image of the sequence of displayed images, the initial displayed image having an initial field of view corresponding to an initial head direction or an initial eye gaze direction (element 230 of FIG. 5).

Execution of the programming by the processor 932 further configures the eyewear device 100 to detect movement of a user of the eyewear device by: (i) tracking, via the head movement tracker (element 109 of FIG. 1B), a head movement of a head of the user, or (ii) tracking, via an eye movement tracker (element 113, 213 of FIGS. 2A-B, FIG. 5), an eye movement of an eye of the user of the eyewear device 100. Execution of the programming by the processor 932 further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor 932 further configures the eyewear device 100 to generate a successive displayed image of the sequence of displayed images based on the field of view adjustment. Execution of the programming by the processor 932 further configures the eyewear device 100 to present, via the see-through image displays 180C-D of the optical assembly 180A-B, the successive displayed images.

FIG. 1B is a top cross-sectional view of the temple of the eyewear device 100 of FIG. 1A depicting the right visible light camera 114B, a head movement tracker 109, and a circuit board. Construction and placement of the left visible light camera 114A is substantially similar to the right visible light camera 114B, except the connections and coupling are on the left lateral side 170A. As shown, the eyewear device 100 includes the right visible light camera 114B and a circuit board, which may be a flexible printed circuit board (PCB) 140. The right hinge 126B connects the right temple portion 110B to a right temple 125B of the eyewear device 100. In some examples, components of the right visible light camera 114B, the flexible PCB 140, or other electrical connectors or contacts may be located on the right temple 125B or the right hinge 126B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass which generates a heading reference. The three accelerometers to detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The right temple portion 110B includes temple body 211 and a temple cap, with the temple cap omitted in the cross-section of FIG. 1B. Disposed inside the right temple portion 110B are various interconnected circuit boards, such as PCBs or flexible PCBs, that include controller circuits for right visible light camera 114B, microphone(s) 130, speaker(s) 132, low-power wireless circuitry (e.g., for wireless short-range network communication via Bluetooth™), high-speed wireless circuitry (e.g., for wireless local area network communication via WiFi).

The right visible light camera 114B is coupled to or disposed on the flexible PCB 240 and covered by a visible light camera cover lens, which is aimed through opening(s) formed in the right temple portion 110B. In some examples, the frame 105 connected to the right temple portion 110B includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing angle of coverage 111B with a line of sight or perspective of the right eye of the user of the eyewear device 100. The visible light camera cover lens can also be adhered to an outward facing surface of the right temple portion 110B in which an opening is formed with an outwards facing angle of coverage, but in a different outwards direction. The coupling can also be indirect via intervening components.

Left (first) visible light camera 114A is connected to the left see-through image display 180C of left optical assembly 180A to generate a first background scene of a first successive displayed image. The right (second) visible light camera 114B is connected to the right see-through image display 180D of right optical assembly 180B to generate a second background scene of a second successive displayed image. The first background scene and the second background scene partially overlap to present a three-dimensional observable area of the successive displayed image.

Flexible PCB 140 is disposed inside the right temple portion 110B and is coupled to one or more other components housed in the right temple portion 110B. Although shown as being formed on the circuit boards of the right temple portion 110B, the right visible light camera 114B can be formed on the circuit boards of the left temple portion 110A, the temples 125A-B, or frame 105.

FIG. 2A is a rear view of an example hardware configuration of an eyewear device 100, which includes an eye scanner 113 on a frame 105, for use in a system for determining an eye position and gaze direction of a wearer/user of the eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the left temple portion 110A adjacent the left lateral side 170A of the frame 105 and the right temple portion 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into temples (not shown) attached to the frame 105.

In the example of FIG. 2A, the eye scanner 113 includes an infrared emitter 115 and an infrared camera 120. Visible light cameras typically include a blue light filter to block infrared light detection, in an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 are co-located on the frame 105, for example, both are shown as connected to the upper portion of the left rim 107A. The frame 105 or one or more of the left and right temples 110A-B include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 can be implemented, including arrangements in which the infrared emitter 115 and infrared camera 120 are both on the right rim 107B, or in different locations on the frame 105, for example, the infrared emitter 115 is on the left rim 107A and the infrared camera 120 is on the right rim 107B. In another example, the infrared emitter 115 is on the frame 105 and the infrared camera 120 is on one of the temples 110A-B, or vice versa. The infrared emitter 115 can be connected essentially anywhere on the frame 105, left temple portion 110A, or right temple portion 110B to emit a pattern of infrared light. Similarly, the infrared camera 120 can be connected essentially anywhere on the frame 105, left temple portion 110A, or right temple portion 110B to capture at least one reflection variation in the emitted pattern of infrared light.

The infrared emitter 115 and infrared camera 120 are arranged to face inwards towards an eye of the user with a partial or full field of view of the eye in order to identify the respective eye position and gaze direction. For example, the infrared emitter 115 and infrared camera 120 are positioned directly in front of the eye, in the upper part of the frame 105 or in the temples 110A-B at either ends of the frame 105.

FIG. 2B is a rear view of an example hardware configuration of another eyewear device 200. In this example configuration, the eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the eyewear device 200, for example, the frame 105. The infrared emitter 215 and infrared camera 220 are like that of FIG. 2A, but the eye scanner 213 can be varied to be sensitive to different light wavelengths as described previously in FIG. 2A.

Similar to FIG. 2A, the eyewear device 200 includes a frame 105 which includes a left rim 107A which is connected to a right rim 107B via a bridge 106; and the left and right rims 107A-B include respective apertures which hold the respective optical elements 180A-B comprising the see-through display 180C-D.

Figure 2C:
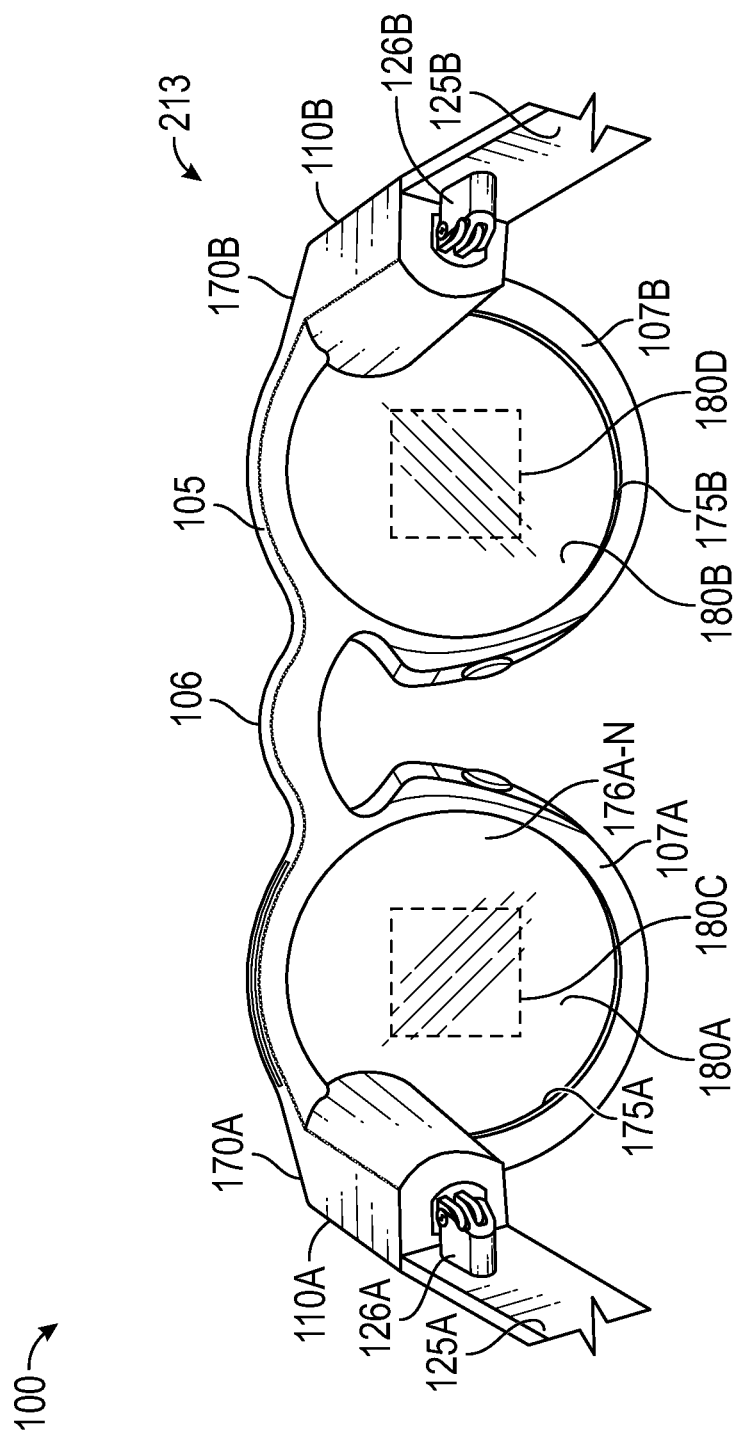
FIGS. 2C and 2D are rear views of example hardware configurations of the eyewear device, including two different types of image displays.
Figure 2D:
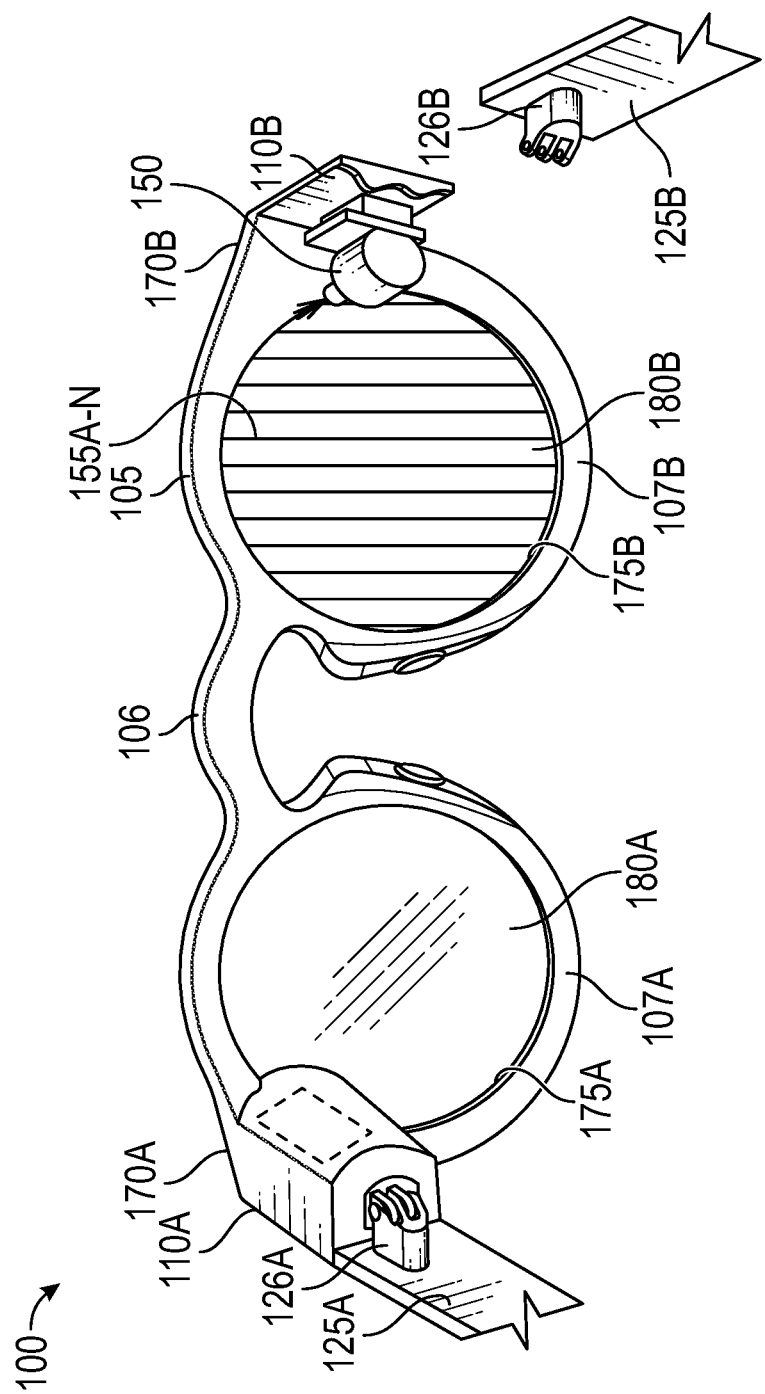

FIGS. 2C-D are rear views of example hardware configurations of the eyewear device 100, including two different types of see-through image displays 180C-D. In one example, these see-through image displays 180C-D of optical assembly 180A-B include an integrated image display. As shown in FIG. 2C, the optical assemblies 180A-B includes a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D. An example is detailed with respect to FIG. 8A-FIG. 8F and will be described further hereafter.

In another example, the see-through image displays 180C-D of optical assembly 180A-B include a projection image display as shown in FIG. 2D. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a left temple portion 110A adjacent the left lateral side 170A of the frame 105 and a right temple portion 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into temples 125A-B attached to the frame 105.

In one example, the see-through image displays include the first see-through image display 180C and the second see-through image display 180D. Eyewear device 100 includes first and second apertures 175A-B which hold the respective first and second optical assembly 180A-B. The first optical assembly 180A includes the first see-through image display 180C (e.g., a display matrix of FIG. 2C or optical strips 155A-N' and a projector 150A). The second optical assembly 180B includes the second see-through image display 180D e.g., a display matrix of FIG. 2C or optical strips 155A-N" and a projector 150B). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
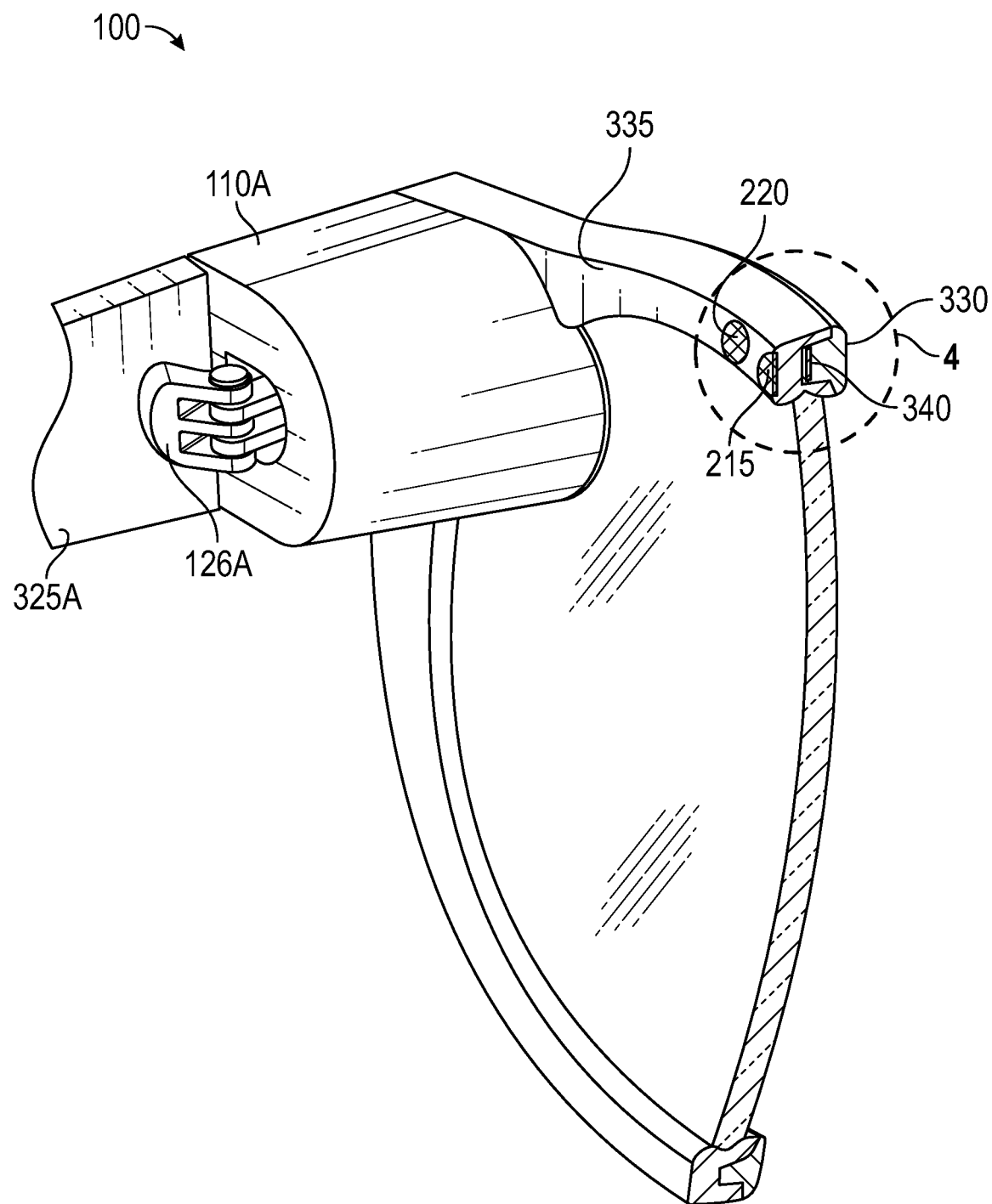
FIG. 3 shows a rear perspective view of the eyewear device of FIG. 2A depicting an infrared emitter, an infrared camera, a frame front, a frame back, and a circuit board.

FIG. 3 shows a rear perspective view of the eyewear device of FIG. 2A. The eyewear device 100 includes an infrared emitter 215, infrared camera 220, a frame front 330, a frame back 335, and a circuit board 340. It can be seen in FIG. 3 that the upper portion of the left rim of the frame of the eyewear device 100 includes the frame front 330 and the frame back 335. An opening for the infrared emitter 215 is formed on the frame back 335.

As shown in the encircled cross-section 4 in the upper middle portion of the left rim of the frame, a circuit board, which is a flexible PCB 340, is sandwiched between the frame front 330 and the frame back 335. Also shown in further detail is the attachment of the left temple portion 110A to the left temple 325A via the left hinge 126A. In some examples, components of the eye movement tracker 213, including the infrared emitter 215, the flexible PCB 340, or other electrical connectors or contacts may be located on the left temple 325A or the left hinge 126A.

Figure 4:
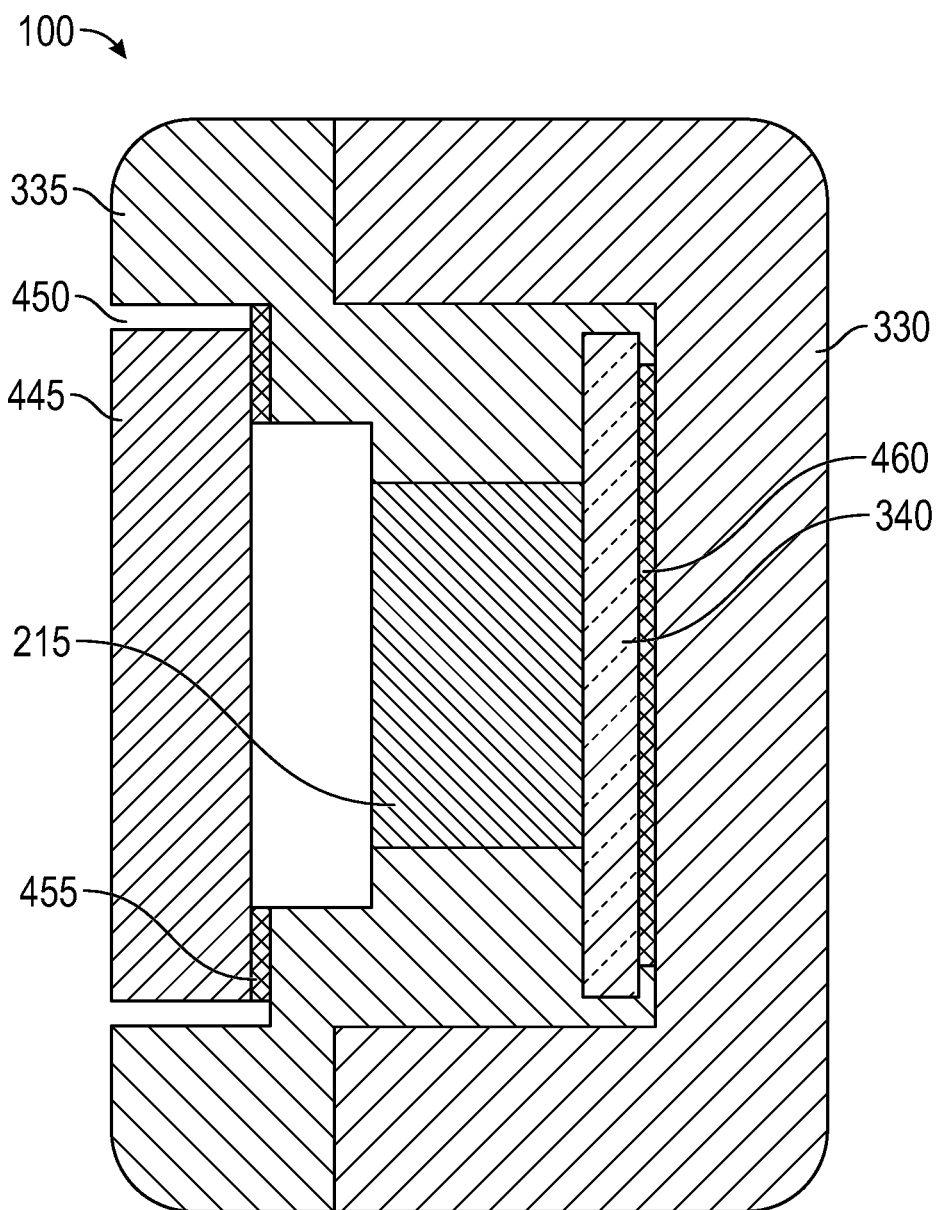
FIG. 4 is a cross-sectional view taken through the infrared emitter and the frame of the eyewear device of FIG. 3.

FIG. 4 is a cross-sectional view through the infrared emitter 215 and the frame corresponding to the encircled cross-section 4 of the eyewear device of FIG. 3. Multiple layers of the eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 5:
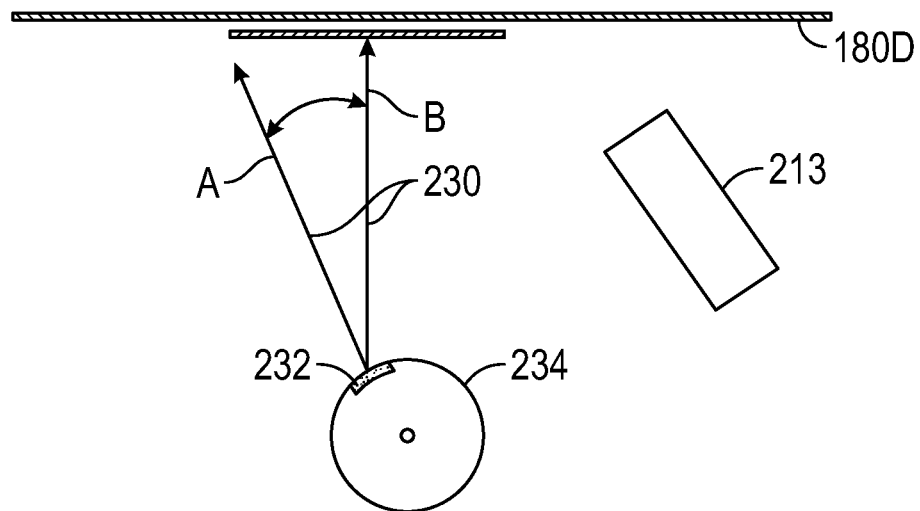
FIG. 5 illustrates detecting eye gaze direction.
Figure 6:
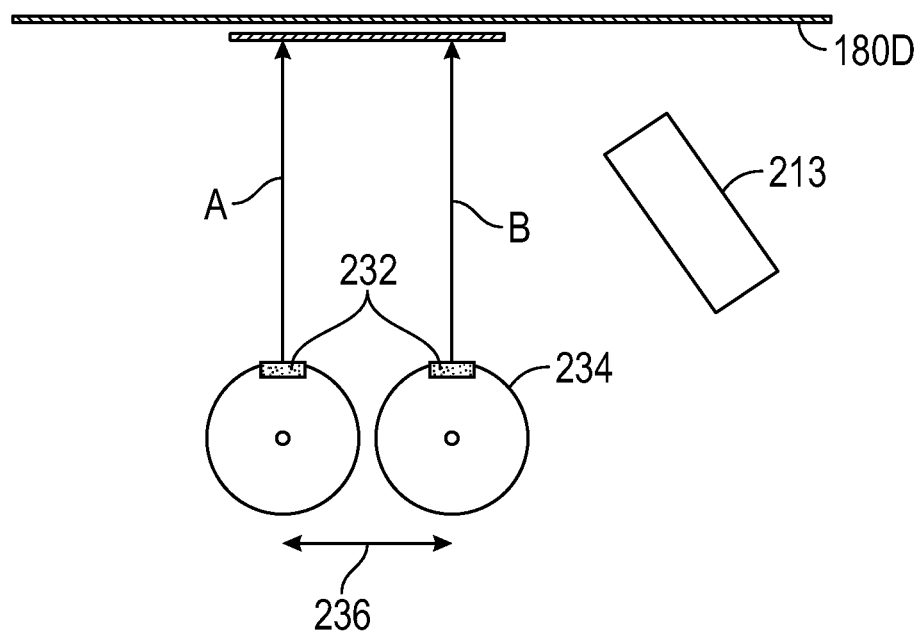
FIG. 6 illustrates detecting eye position.

In an example, the processor 932 utilizes eye tracker 213 to determine an eye gaze direction 230 of a wearer's eye 234 as shown in FIG. 5, and an eye position 236 of the wearer's eye 234 within an eyebox as shown in FIG. 6. The eye tracker 213 is a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to the see-through display 180D.

Figure 7:
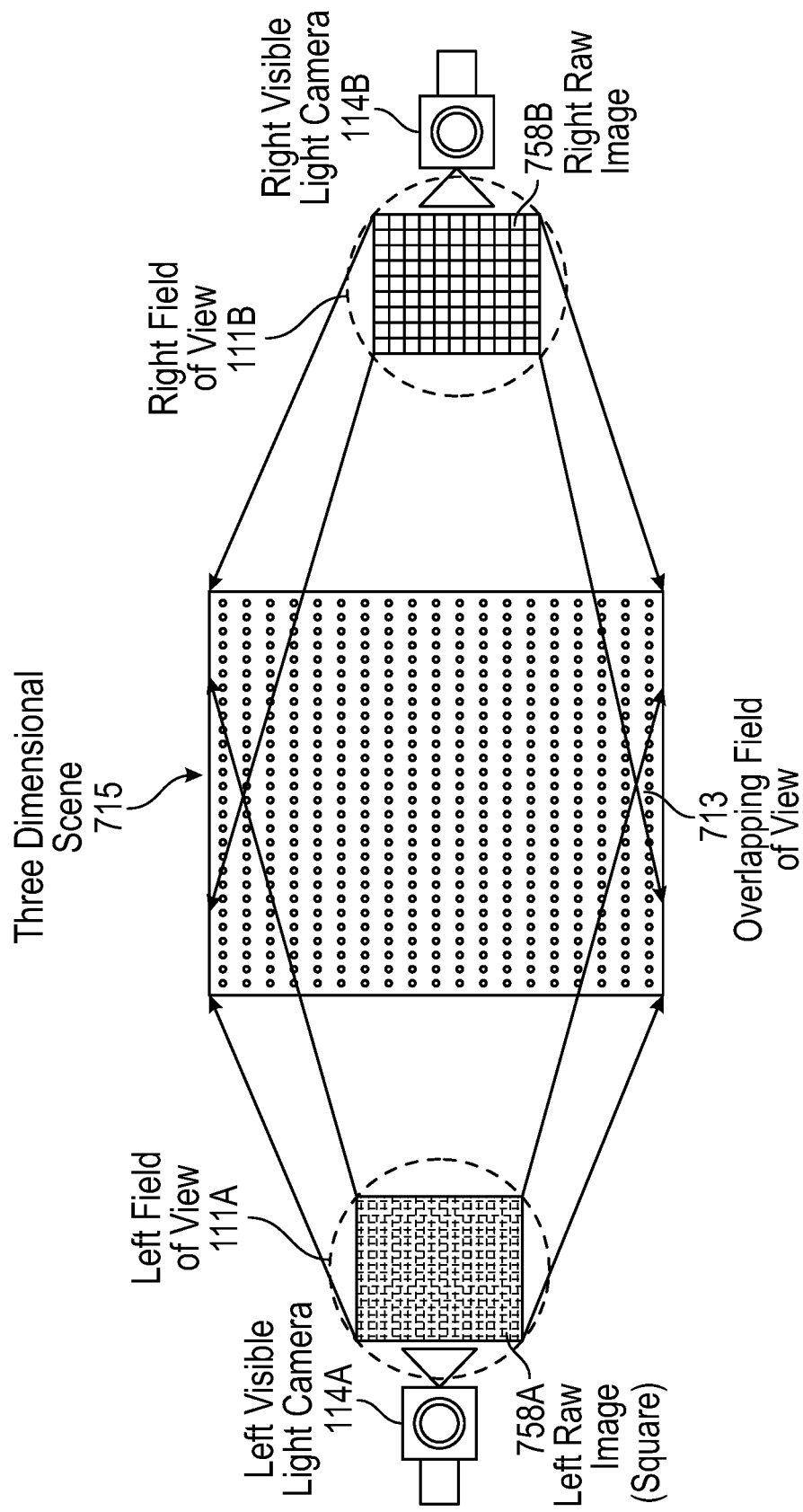
FIG. 7 depicts an example of visible light captured by the left visible light camera as a left raw image and visible light captured by the right visible light camera as a right raw image.
Figure 9:
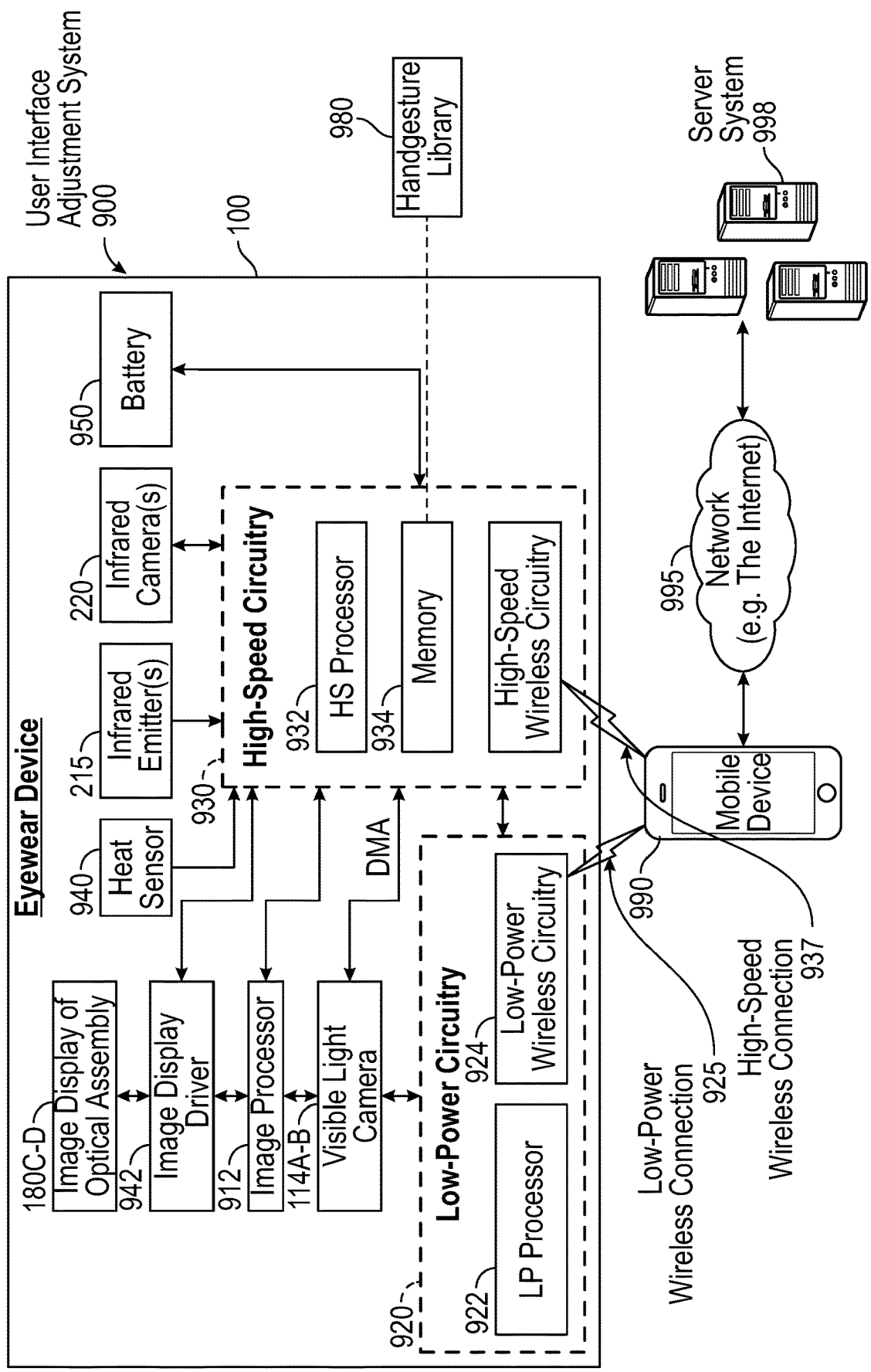
FIG. 9 illustrates a block diagram of electronic components of the eyewear device.

FIG. 7 depicts an example of capturing visible light with cameras 114A-B. Visible light is captured by the left visible light camera 114A with a round field of view (FOV). 111A. A chosen rectangular left raw image 758A is used for image processing by image processor 912 (FIG. 9). Visible light is captured by the right visible light camera 114B with a round FOV 111B. A rectangular right raw image 758B chosen by the image processor 912 is used for image processing by processor 912. Based on processing of the left raw image 758A and the right raw image 758B, a three-dimensional image 715 of a three-dimensional scene, referred to hereafter as an immersive image, is generated by processor 912 and displayed by displays 180C and 180D and which is viewable by the user.

The human visual system (HVS) relies on a complex set of muscular functions to focus on objects and judge their depth in space. Accommodation is a squeezing of the ciliary muscle to distort the eye lens to focus at an image plane. Vergence is the rotation of both eyes toward an object to binocularly fuse the two images into a single perceived image. The amount of vergence required to fuse an object gives the HVS a sense of the distance the object is from the viewer. The processes of accommodation and vergence are linked by a feedback mechanism, wherein accommodation is adjusted then vergence, and iterated upon, until a focused and fused image of the object is presented to the observer. This adjustment happens in an analog fashion over a large range of object distances (e.g., 30 cm to infinity) in the natural world.

Stereoscopic displays are designed to recreate this sensation of depth in objects by adding disparity (a horizontal angular difference in image location) between the two images sent to the eyes. This disparity in left/right images requires the eyes to verge in order to fuse the images, giving the sensation of depth. Typically, stereoscopic displays are limited to a few discrete accommodation planes (or focal planes), as schemes for increasing the number of focal planes create a bulkier and heavier package (which affects user comfort) and requires higher frame rate imagery (a decrement to battery life and image brightness). In order to reduce size, weight and frame rate, one example design is a single accommodation plane in an AR device while presenting images with disparity for depth sensation. When the vergence and accommodation distances do not match, as is often the case in stereoscopic displays, the situation is called vergence-accommodation conflict (VAC). There are limits to the amount of VAC a person can comfortably tolerate. Recent studies on stereoscopic cinema, television and handheld devices indicate that vergence errors beyond+/−0.5 diopters (diopters=1/object distance in meters) of the accommodation distance will result in eye strain and discomfort for longer periods of time.

Figure 8A:
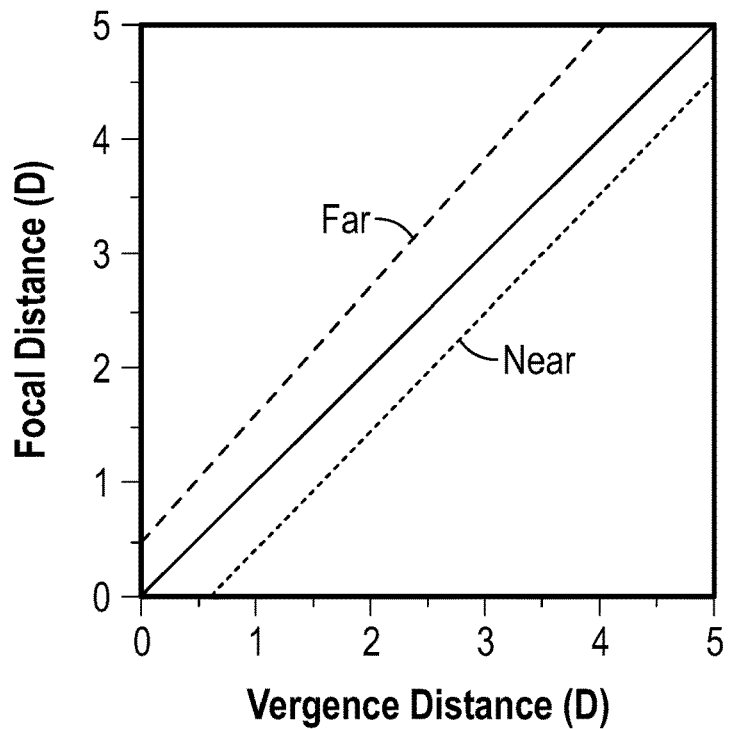
FIG. 8A illustrates a zone of user comfort for focal distance vs. vergence distance in diopter.

FIG. 8A depicts the region where VAC is small enough to create a comfortable, longer term viewing experience. If most stereoscopic content is, for example, occurring at a depth of 0.67 meters, an accommodation (or focal) plane can be selected at 0.67 m (or 1.5 diopters) to match the typical depth and account for minor depth excursions beyond 1.5 diopters. From the graph in FIG. 8A, a single accommodation plane at 1.5 diopters has a comfortable vergence range of 0.9 diopters (1.1 m) to 2.0 diopters (0.5 m).

The AR eyewear 100 can have the displays 180C and 180D include waveguides populated with diffractive structures to direct respective virtual images 715 from a respective projector (not shown) of the eyewear 100 to the user's eye. Diffractive structures which place the respective virtual image 715 at infinity can have benefits, such as simpler design and manufacturing, wider field of view (FOV), better pupil replication, higher efficiency and improved color uniformity. Again looking at FIG. 8A, if the virtual images 715 are placed at infinity (focal distance=0 diopter), then the practical zone of user comfort is from 0 diopter (infinity meters) to 0.6 diopter (1.7 meters), missing the target established above of 1.5 diopter (0.67 meter) for the majority of the virtual content.

Figure 8B:
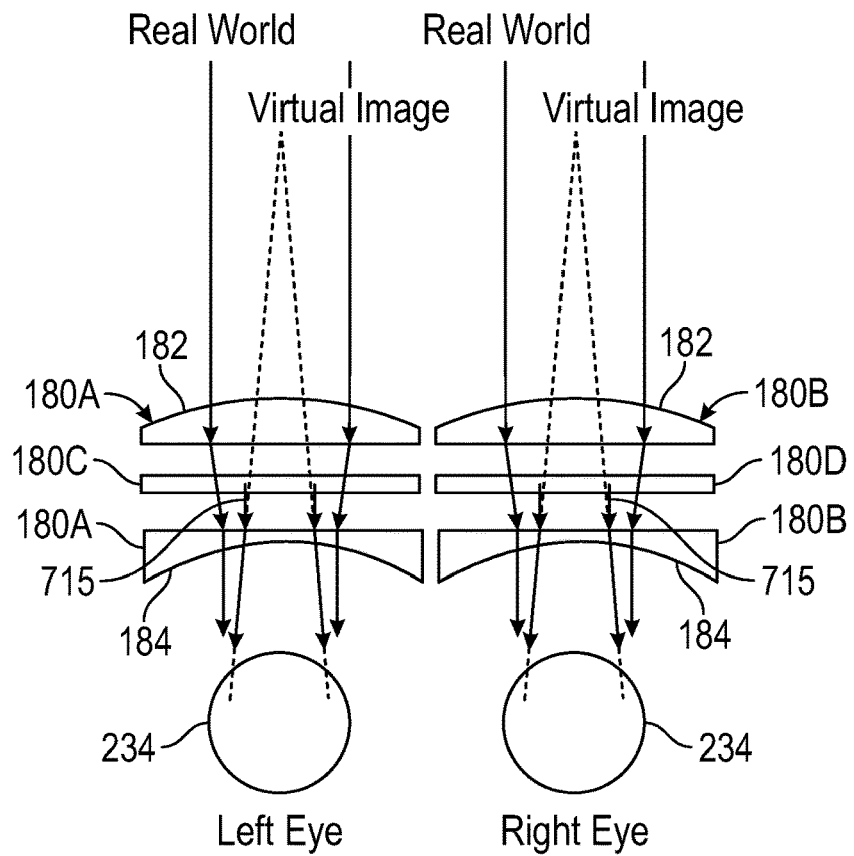
FIG. 8B illustrates a lens system.

Referring to FIG. 8B, to move the virtual content from infinity to 0.67 m, a first lens 182 of the optical assembly 180A with −1.5 diopter power is placed between the waveguide display 180A and the user's eye 234. The first lens 182 pulls the virtual content from infinity to a focal plane of 0.67 m. However, with only the −1.5 diopter lens 182 in place, the view of the world is also altered, inhibiting the ability of the user to navigate the real world. To remedy the situation, a second lens 184 of optical assembly 180A with +1.5 diopter power is placed on the opposite side of the waveguide display 180A to compensate for the power of the −1.5 diopter lens, thereby preserving the world view. Likewise, a lens 182 and a lens 184 are positioned on opposite sides of the waveguide display 180B as shown.

Figure 8C:
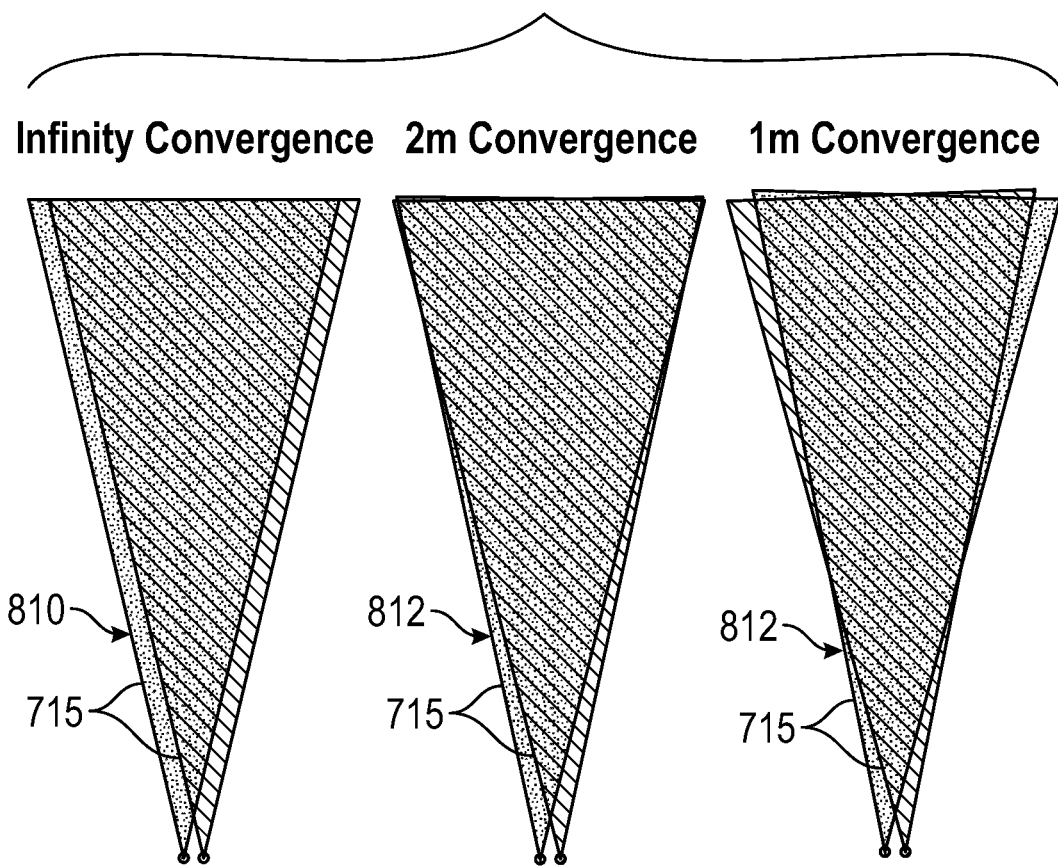
FIG. 8C illustrates examples of binocular overlap in virtual images.

FIG. 8C shows three cases of binocular overlap for virtual images 715. In the first case shown at 810, the images 715 are not tilted inward, resulting in a convergence (or 100% overlap) at infinity. In the second case shown at 812, the images 715 are tilted inward such that the virtual images converge near 2 m. In the third case shown at 814, the images 715 are tilted to converge at 1 m.

Figure 8D:
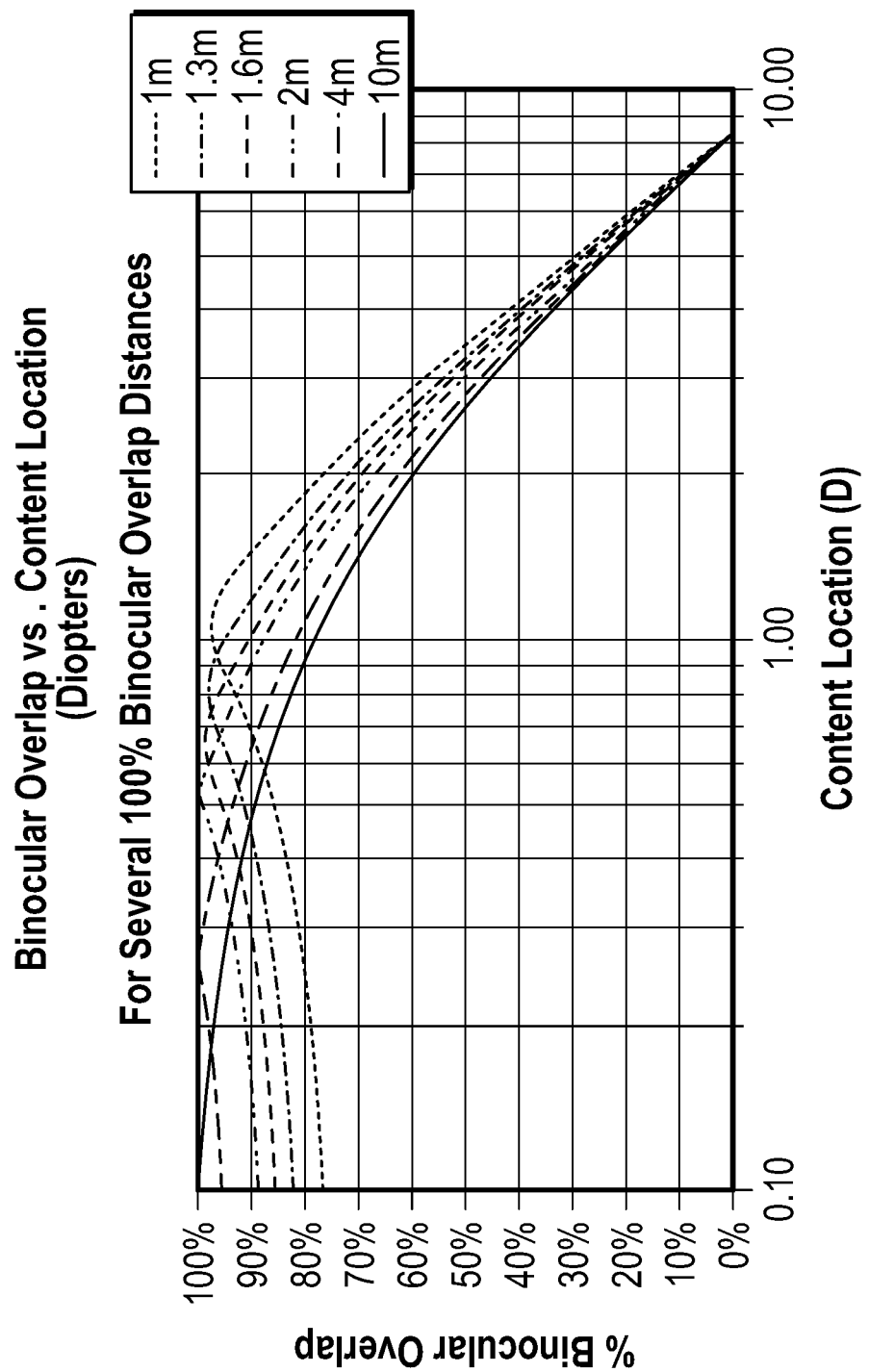
FIG. 8D illustrates binocular overlap vs. content location.

FIG. 8D depicts the percent binocular overlap versus content location (or vergence in diopter) at several accommodation planes (1 m to 10 m) for a typical AR device virtual image 715. If the convergence distance of the virtual images 715 is set equal to the accommodation distance, then the binocular overlap is maximized at that distance and slowly decreases for content at other vergence distances (or depths).

Figure 8E:
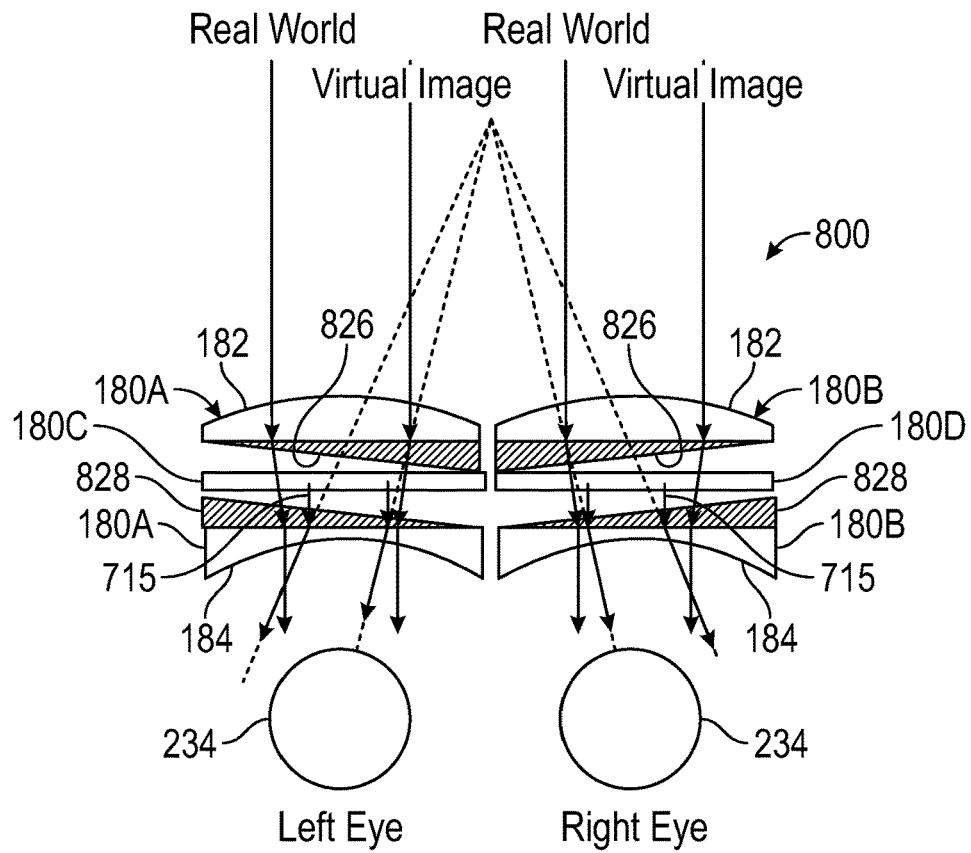
FIG. 8E illustrates a push-pull compensating system for converging the virtual images in an augmented reality (AR) device.

FIG. 8E depicts an AR system 800 utilizing a compensating "push-pull" lens set included in the eyewear 100. The overlap of two virtual images 715 generated by respective display 180C and 180D as seen by the user's two eyes 234 contributes to user comfort. In a stereoscopic display with a single accommodation plane, the binocular overlap of the two virtual images 715 depends on the location of the accommodation plane and the depth of the content formed by disparity in the two images 715. If most of the content occurs at or near the location where the virtual images 715 are substantially overlapped (e.g., at or near 100%), then user viewing comfort is improved. One way to control binocular overlap is to tilt or steer the virtual images 715 inward, such that the overlap occurs at the accommodation plane.

Figure 8F:
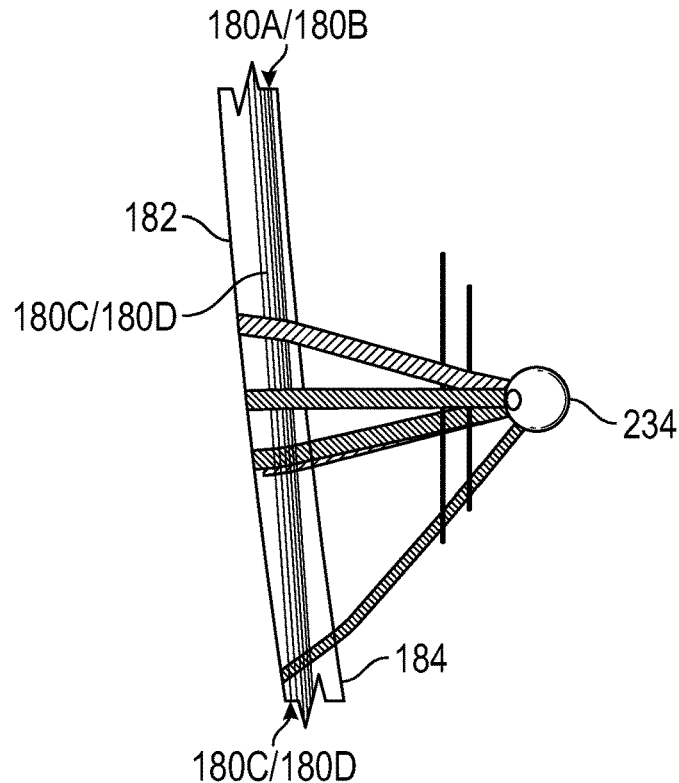
FIG. 8F illustrates a push-pull lens system with integrated optical element, shown as wedges.

For improved user comfort, the virtual images 715 in the eyewear device 100 including AR system 800 are tilted to converge at the accommodation plane. One type of optical mechanism for tilting an image is a prism. FIG. 8E depicts a first prism 826 of layer 176 (FIG. 2C) inserted between the negative-powered lens 182 (in a push pull system) and the waveguide display 180A. The first prism 826 tilts the respective real-world image inward to produce a binocular overlap of the two images that coincides with the single accommodation plane. In the same manner, a second prism 828 of layer 176 is inserted on the opposite side of the waveguide display 180A to compensate for the first prism 826 and afford an unaltered view of the outside world. The inward tilt of the real-world image by the first prism 826, and then the compensation by the second prism 828 is referred to as a push-pull lens set. The second prism 828 also tilts the processed displayed images 715 toward the single accommodation plane. The prisms 826 and 828 can be separate elements inserted into the optical system as shown in FIG. 8E, or they can be integrated into the push-pull lenses 182 and 184, as depicted in FIG. 8F. Each lens 184 near the eye in FIG. 8F is a negative power lens formed as a wedge, and each lens 182 on the opposite side of the waveguide display 180A is a lens with compensating optical power and prism. The separated or integrated lenses 182 and 184, and the prisms 826 and 828, can have planar surfaces, spherical surfaces, conic surfaces, toroidal or biconic shapes.

It is important that the optical power of the two surfaces of the prisms 826 and 828 compensate for each other when considering the world view. It is also important that the turning power of the two opposing prisms 826 and 828 compensate for each other when considering the world view. For maximum binocular overlap at the accommodation plane, the prisms 826 and 828 must steer the beam with the appropriate amount of angle to the accommodation plane. The angle is determined by the wedge angle and the wedge material. The separated or integrated lenses 182 and 184, and prisms 826 and 828 do not necessarily have to be made of the same material, as long as the optical power and deflection angle are compensated. The addition of conic, biconic, aspheric and/or toroidal terms in the lens surface profile allow for reductions in distortion and distortion with eye movement, and improve the modulation transfer function (or resolvable pixel size) in the world view and virtual image 715.

FIG. 9 depicts a high-level functional block diagram including example electronic components disposed in eyewear 100 and 200. The illustrated electronic components include the processor 932, the memory 934, and the see-through image display 180C and 180D.

Memory 934 includes instructions for execution by processor 932 to implement functionality of eyewear 100/200, including instructions for processor 932 to control in the image 715. Processor 932 receives power from battery (not shown) and executes the instructions stored in memory 934, or integrated with the processor 932 on-chip, to perform functionality of eyewear 100/200, and communicating with external devices via wireless connections.

A user interface adjustment system 900 includes a wearable device, which is the eyewear device 100 with an eye movement tracker 213 (e.g., shown as infrared emitter 215 and infrared camera 220 in FIG. 2B). User interface adjustments system 900 also includes a mobile device 990 and a server system 998 connected via various networks. Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 includes at least two visible light cameras 114A-B (one associated with the left lateral side 170A and one associated with the right lateral side 170B). Eyewear device 100 further includes two see-through image displays 180C-D of the optical assembly 180A-B (one associated with the left lateral side 170A and one associated with the right lateral side 170B). Eyewear device 100 also includes image display driver 942, image processor 912, low-power circuitry 920, and high-speed circuitry 930. The components shown in FIG. 9 for the eyewear device 100 and 200 are located on one or more circuit boards, for example a PCB or flexible PCB, in the temples. Alternatively, or additionally, the depicted components can be located in the temples, frames, hinges, or bridge of the eyewear device 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 945 implements the user interface field of view adjustment instructions, including, to cause the eyewear device 100 to track, via the eye movement tracker 213, the eye movement of the eye of the user of the eyewear device 100. Other implemented instructions (functions) cause the eyewear device 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 934 to present the sequence of displayed images, including the initial displayed image with the initial field of view and the successive displayed image with the successive field of view.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays 180C-D of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the eyewear device 100 and 200 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, color maps, camera data generated by the left and right visible light cameras 114A-B and the image processor 912, as well as images generated for display by the image display driver 942 on the see-through image displays 180C-D of the optical assembly 180A-B. While memory 934 is shown as integrated with high-speed circuitry 930, in other examples, memory 934 may be an independent standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that include a processor, a memory, and network communication interface to communicate over the network 995 with the mobile device 990 and eyewear device 100/200. Eyewear device 100 and 200 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100 and 200, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements 919. Such peripheral device elements may include ambient light and spectral sensors, biometric sensors, additional sensors, or display elements integrated with eyewear device 100. For example, peripheral device elements 919 may include any I/O components including output components, motion components, position components, or any other such elements described herein. The eyewear device 100 can take other forms and may incorporate other types of frameworks, for example, a headgear, a headset, or a helmet.

For example, the biometric components of the user interface field of view adjustment 900 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some examples, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third-party application can invoke API calls provided by the operating system to facilitate functionality described herein.

Figure 10A:
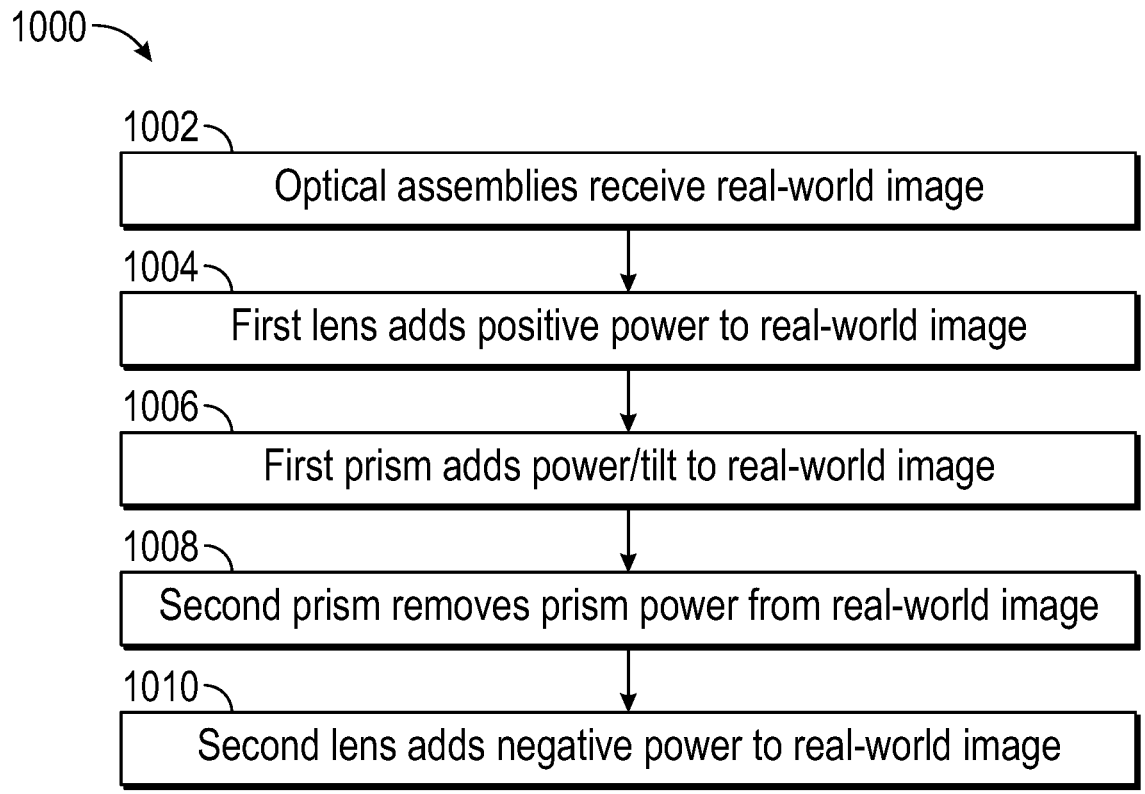
FIG. 10A and FIG. 10B illustrate a method of processing real-world images and a virtual image, respectfully.
Figure 10B:
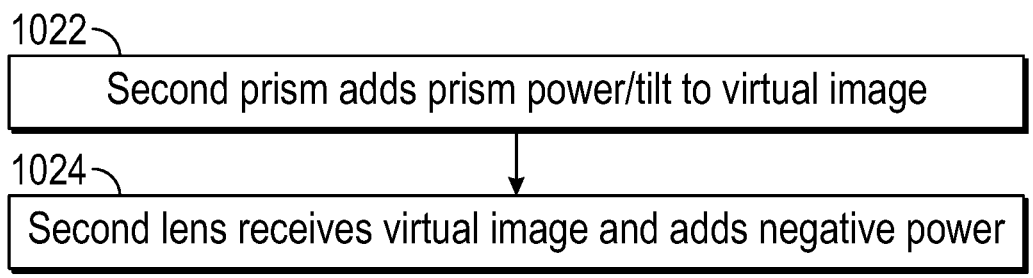

Referring now to FIG. 10A and FIG. 10B, there is shown a method 1000 and method 1020 to produce a binocular overlap of the two images 715 that coincides with the accommodation plane.

Referring to block 1002 of FIG. 10A, there is shown the optical processing of a real-world image. The optical assembly 180A and 180B each include a respective first lens 182 and first prism 826 receiving the real-world image.

At block 1004, the respective first lens 182 adds a positive power to converge the real-world image toward the respective image display 180A and 180B.

At block 1006, the respective first prism 826 tilts the converged real-world image toward the respective image display 180A and 180B. The converged and tilted respective real-world images each then pass through the respective image display 180C and 180D, as shown in FIG. 8E.

At block 1008, the respective second prism 828 removes the prism power created by first prism 826 and tilts the real-world image away from the image display 180C and 180D.

At block 1010, the respective second lens 184 adds a negative power and diverges the respective converged real-world image toward the respective user eye 234.

Referring to FIG. 10B, there is shown a method 1020 illustrating the optical processing of the virtual image displayed by display 180A and 180B.

At block 1022, the respective second prism 828 tilts the respective displayed virtual image away from the image display 180C and 180D.

At block 1024, the respective second lens 184 adds a negative power and diverges the respective displayed virtual image toward the respective user eye 234.

The respective first prism 826 tilts the real-world image inward to produce a binocular overlap of the two images that coincides with the single accommodation plane. In the same manner, the respective second prism 828 on the opposite side of the waveguide display 180A compensates for the first prism 826 and affords an unaltered view of the outside world. The second prism 828 also tilts the processed displayed images 715 toward the single accommodation plane. The prisms 826 and 828 can be separate elements inserted into the optical system 800 as shown in FIG. 8E, or they can be integrated into the push-pull lenses 182 and 184, as depicted in FIG. 8F. Each lens 184 near the eye in FIG. 8F is a negative power lens formed as a wedge, and each lens 182 on the opposite side of the waveguide display 180A is a positive power lens. The optical power of the two prism compensate for each other when considering the world view. The turning power of the two opposing prisms 826 and 828 compensate for each other when considering the world view. For maximum binocular overlap at the accommodation plane, the prisms 826 and 828 steer the respective beam with the appropriate amount of angle to the accommodation plane.

Figure 11:
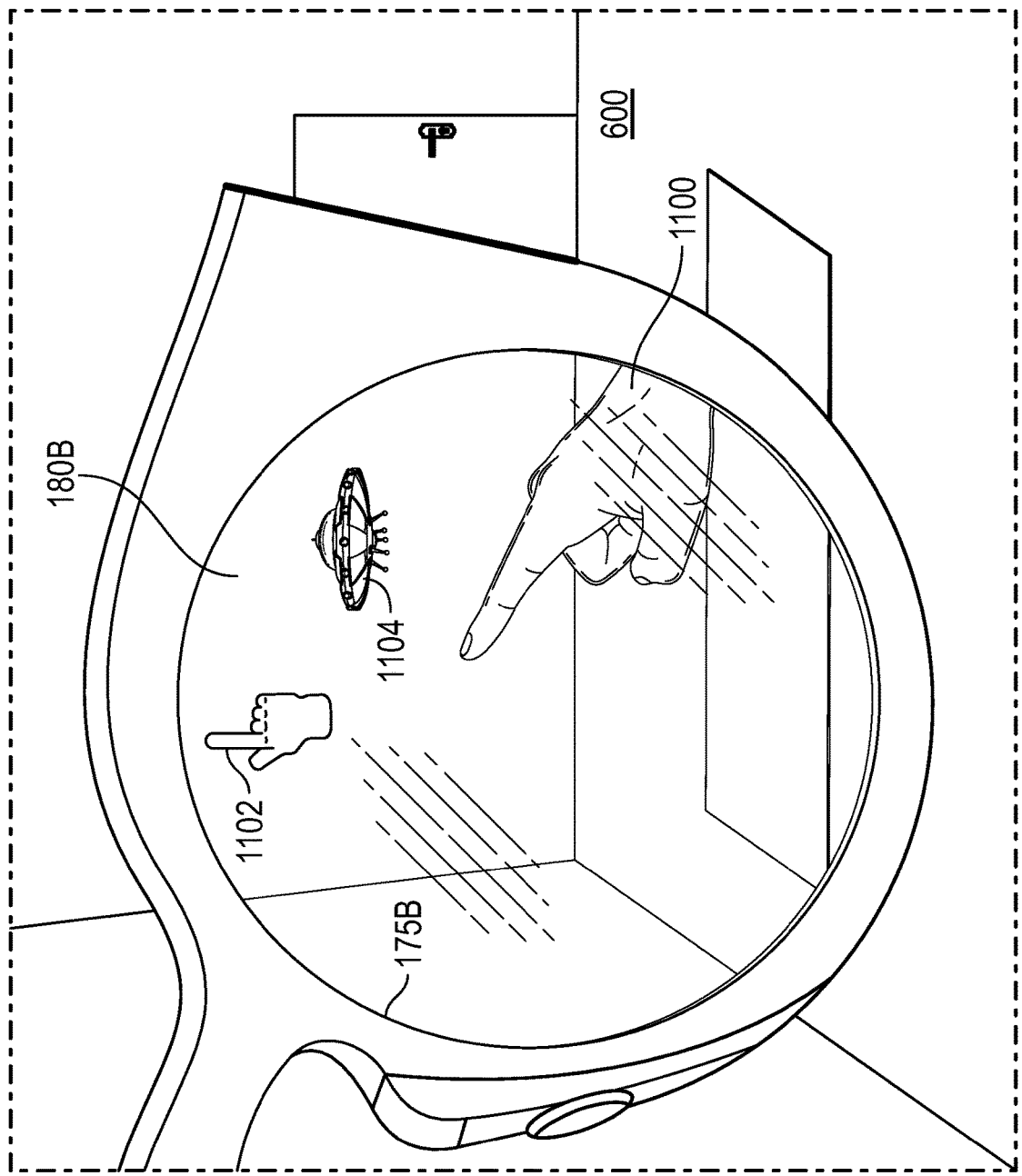
FIG. 11 illustrates an example wearable device (e.g., an eyewear device) with visual user input.

Referring to FIG. 11, the processor 932 presents images to the user on the image displays 180 using the image processor 912 and the image display driver 942. The processor 932 develops and presents the visual images via the image displays responsive to the location of the eyewear device 100 within an environment 600. In one example, the visual images include an image of a hand 1102 for manipulating features of a graphical user interface (GUI) and a virtual space craft 1104.

The GUI may be presented on the display 180 of the eyewear device 100, the display of the mobile device 990, or a display for a remote computer such as the server system 998. In one example, a user may manipulate selectors and actuate the buttons using a user input device of the eyewear device 100, using a user input layer of the mobile device 990, or a user input of another device.

In another example, a user may manipulate the selectors and actuate the buttons through hand gestures captured by the cameras 114 of the eyewear device 100. In accordance with this example, the processor 932 of an eyewear device 100 is configured to capture frames of video data with camera 114A, 114B. Objects in the images (such as a hand 1100) are compared to the hand gesture library 980 to identify predefined hand gestures (e.g., a pointing index finger) associated with an action. When a hand gesture is identified, its position is determined with respect to the selectors and actuate the buttons. A modification of the hand gesture (e.g., a tapping motion when the tip of the index finger is near a button or a swiping motion when the tip of the index finger is near a selector) results in an actuation of the buttons/selector.

The process of determining whether a detected hand shape matches a predefined gesture, in some implementations, involves comparing the pixel-level data about the hand shape in one or more captured frames of video data to a collection of hand gestures stored in a hand gesture library 980 (FIG. 9). The detected hand shape data may include three-dimensional coordinates for the wrist, up to fifteen interphalangeal joints, up five fingertips, and other skeletal or soft-tissue landmarks found in a captured frame. These data are compared to hand gesture data stored in the hand gesture library 980 until the best match is found. In some examples, the process includes calculating the sum of the geodesic distances between the detected hand shape fingertip coordinates and a set of fingertip coordinates for each hand gesture stored in the library 980. A sum that is within a configurable threshold accuracy value represents a match.

In another example implementation, the process of determining whether a detected hand shape matches a predefined gesture, involves using a machine-learning algorithm to compare the pixel-level data about the hand shape in one or more captured frames of video data to a collection of images that include hand gestures.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

In the machine-learning example, the processor 932 determines whether a detected hand shape substantially matches a predefined gesture using a machine-trained algorithm referred to as a hand feature model. The processor 932 is configured to access the hand feature model, trained through machine learning, and applies the hand feature model to identify and locate features of the hand shape in one or more frames of the video data.

In one example implementation, the trained hand feature model receives a frame of video data which contains a detected hand shape and abstracts the image in the frame into layers for analysis. Data in each layer is compared to hand gesture data stored in the hand gesture library 980, layer by layer, based on the trained hand feature model, until a good match is identified.

In one example, the layer-by-layer image analysis is executed using a convolutional neural network. In a first convolution layer, the CNN identifies learned features (e.g., hand landmarks, sets of joint coordinates, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a possible palm shape, a possible finger joint). The values and comparisons of images from the non-output layers are used to classify the image in the frame. Classification, as used herein, refers to the process of using a trained model to classify an image according to the detected hand shape. For example, an image may be classified as "pointer gesture present" if the detected hand shape matches the pointer gesture from the library 980.

In some example implementations, the processor 932, in response to detecting a pointing gesture, presents on the display 180A-B an indicator 1102 (see FIG. 11). The indicator 1102 informs the wearer that a predefined gesture has been detected. The indicator 1102 in one example is an object, such as the pointing finger shown in FIG. 11. The indicator 1102 may include one or more visible, audible, tactile, and other elements to inform or alert the wearer that a pointer gesture has been detected. A user may move the indicator 1102 by moving a detected hand 1100 within the field of view of the eyewear device 100.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Eyewear, comprising:
a frame;
a stereoscopic display supported by the frame;
an image processor configured to process images and display the processed images on the stereoscopic display;
a first optical assembly and a second optical assembly each configured to receive and pass a real-world image, and also to pass the displayed processed images, wherein each of the first and second optical assembly include a first lens configured to direct the real-world image toward the stereoscopic display, a first prism physically separate from the first lens and configured to direct the real-world image toward the stereoscopic display, a second lens configured to compensate for the first lens and direct the real-world image, and a second prism physically separate from the second lens and configured to direct the displayed processed image toward a single accommodation plane; and
a respective lens set coupled to each of the first and second optical assemblies, the respective lens set configured to produce a binocular overlap of the respective displayed processed images that coincides with the single accommodation plane.

2. The eyewear of claim 1, wherein the binocular overlap of the respective real-world image and the displayed processed images is nearly 100%.

3. The eyewear of claim 1, wherein the binocular overlap of the displayed processed images is a function of the location of the accommodation plane and a depth of content formed by a disparity in the displayed processed images.

4. The eyewear of claim 1, wherein the first prism is configured to tilt the real-world image inward toward the stereoscopic display, and the second prism is configured to tilt the real-world image outward.

5. The eyewear of claim 1 wherein the first prism is spatially coupled to the first lens of the first optical assembly, and the second prism is spatially coupled to the second lens of the first optical assembly.

6. The eyewear of claim 1, wherein the first prism is directly coupled to the first lens of the first optical assembly, and the second prism is directly coupled to second lens of the first optical assembly.

7. The eyewear of claim 1, wherein the first prism and the second prism each comprise a wedge-shaped prism.

8. The eyewear of claim 1, wherein the displayed processed image comprises an immersive image.

9. The eyewear of claim 1, wherein the eyewear comprises a pair of cameras, and wherein the image processor is configured to process the images from the pair of cameras to generate the processed images.

10. The eyewear of claim 1, wherein the optical assembly further includes a waveguide, wherein the first prism is disposed between the first lens and the waveguide, and the second prism is disposed between the waveguide and the second lens.

11. A method of operating eyewear having:
a frame;
a stereoscopic display supported by the frame;
an image processor configured to process images and display the processed images on the stereoscopic display;
a first optical assembly and a second optical assembly each configured to receive and pass a real-world image, and also to pass the displayed processed images, wherein each of the first and second optical assembly include a first lens configured to direct the real-world image toward the stereoscopic display, a first prism physically separate from the first lens and configured to direct the real-world image toward the stereoscopic display, a second lens configured to compensate for the first lens and direct the real-world image, and a second prism physically separate from the second lens and configured to direct the displayed processed image toward a single accommodation plane; and
a respective lens set coupled to each of the first and second optical assemblies, the respective lens set configured to produce a binocular overlap of the respective displayed processed images that coincides with the single accommodation plane, comprising the steps of:
the image processor processing images and displaying the processed images on the stereoscopic display;
the first optical assembly and the second optical assembly each receiving and passing the real-world image and the displayed processed images; and
the lens sets producing a binocular overlap of the displayed processed images that coincides with a single accommodation plane.

12. The method of claim 11, wherein the binocular overlap of the respective real-world image and the displayed processed images is nearly 100%.

13. The method of claim 11, wherein the binocular overlap of the displayed processed images is a function of the location of the accommodation plane and a depth of content formed by a disparity in the displayed processed images.

14. The method of claim 11 wherein the first prism is configured to tilt the real-world image inward toward the stereoscopic display, and the second prism is configured to tilt the real-world image outward.

15. The method of claim 11, wherein the first prism is spatially coupled to the first lens of the first optical assembly, and the second prism is spatially coupled to the second lens of the first optical assembly.

16. The method of claim 11, wherein the first prism is directly coupled to the first lens of the first optical assembly, and the second prism is directly coupled to the second lens of the first optical assembly.

17. The method of claim 11, wherein the first prism and the second prism each comprise a wedge-shaped prism.

18. The method of claim 11, wherein the displayed processed image comprises an immersive image.

19. The method of claim 11, wherein the eyewear comprises a pair of cameras, and wherein the image processor processes the images from the pair of cameras and generates the processed images.

20. The method of claim 11, wherein the optical assembly further includes a waveguide, wherein the first prism is disposed between the first lens and the waveguide, and the second prism is disposed between the waveguide and the second lens.

\* \* \* \* \*